United States Patent
Yu et al.

(10) Patent No.: US 9,507,418 B2
(45) Date of Patent: Nov. 29, 2016

(54) EYE TRACKER BASED CONTEXTUAL ACTION

(75) Inventors: Aron Yu, Stockholm (SE); John Mikael Holtz Elvesjo, Stockholm (SE)

(73) Assignee: TOBII AB, Danderyd (SE)

(*) Notice: Subject to any disclaimer, the term of this patent is extended or adjusted under 35 U.S.C. 154(b) by 0 days.

(21) Appl. No.: 12/691,289

(22) Filed: Jan. 21, 2010

(65) Prior Publication Data
US 2011/0175932 A1  Jul. 21, 2011

(51) Int. Cl.
*G06F 3/01* (2006.01)
*G06F 3/048* (2013.01)

(52) U.S. Cl.
CPC ............. *G06F 3/013* (2013.01); *G06F 3/048* (2013.01)

(58) Field of Classification Search
CPC ............ G09G 2340/0407; G09G 5/391; G09G 5/14; G06T 3/4007; G06T 3/40; G06T 11/60; A61B 8/00; A61B 8/0841; A61B 8/12; G06F 3/016
USPC ......... 345/660, 661, 8, 156, 634, 169, 175, 345/619, 157, 665, 667; 715/863, 781; 3/660, 661, 8, 156, 634
See application file for complete search history.

(56) References Cited

U.S. PATENT DOCUMENTS

| | | | |
|---|---|---|---|
| 6,204,828 B1 | 3/2001 | Amir et al. | |
| 7,013,258 B1 | 3/2006 | Su et al. | 704/1 |
| 7,486,302 B2 * | 2/2009 | Shoemaker | 345/661 |
| 7,561,143 B1 * | 7/2009 | Milekic | 345/156 |
| 7,572,008 B2 | 8/2009 | Elvesjo et al. | 351/206 |
| 8,564,533 B2 * | 10/2013 | Yuan | 345/156 |
| 2004/0193413 A1 * | 9/2004 | Wilson et al. | 382/209 |
| 2005/0243054 A1 * | 11/2005 | Beymer et al. | 345/156 |
| 2006/0033762 A1 * | 2/2006 | Card et al. | 345/660 |
| 2009/0273562 A1 | 11/2009 | Baliga et al. | 345/157 |
| 2010/0125816 A1 * | 5/2010 | Bezos | 715/863 |
| 2010/0182243 A1 * | 7/2010 | Singh et al. | 345/169 |
| 2010/0225668 A1 * | 9/2010 | Tatke et al. | 345/660 |
| 2010/0231504 A1 * | 9/2010 | Bloem et al. | 345/156 |
| 2010/0238280 A1 * | 9/2010 | Ishii | 345/634 |
| 2011/0006978 A1 * | 1/2011 | Yuan | 345/156 |
| 2011/0043644 A1 * | 2/2011 | Munger et al. | 345/8 |
| 2012/0105486 A1 * | 5/2012 | Lankford | G06F 3/013 345/661 |
| 2012/0272179 A1 * | 10/2012 | Stafford | 345/157 |
| 2015/0135132 A1 * | 5/2015 | Josephson | 715/784 |

FOREIGN PATENT DOCUMENTS

| | | | |
|---|---|---|---|
| JP | 04-372012 | 12/1992 | |
| JP | 08-263258 | 10/1996 | |
| JP | 2009-081309 | 3/1997 | |
| JP | 10-207615 | 8/1998 | |
| JP | 11-288342 | 10/1999 | |
| JP | 11288342 A | * 10/1999 | |
| JP | 2000-231427 | 8/2000 | |
| JP | 2002-324064 | 11/2002 | |
| JP | 2006-2440368 | 9/2006 | |
| JP | 2009-037434 | 2/2009 | |
| JP | 11-167644 | 9/2011 | |
| WO | 2010127714 | 11/2010 | G06F 3/048 |

* cited by examiner

*Primary Examiner* — Chante Harrison
(74) *Attorney, Agent, or Firm* — Allen, Dyer, Doppelt, Milbrath & Gilchrist, P.A.

(57) ABSTRACT

The present invention relates to systems and methods for assisting a user when interacting with a graphical user interface by combining eye based input with input for e.g. selection and activation of objects and object parts and execution of contextual actions related to the objects and object parts. The present invention also relates to such systems and methods in which the user can configure and customize specific combinations of eye data input and input that should result in a specific contextual action.

14 Claims, 6 Drawing Sheets

EYE TRACKER BASED CONTEXTUAL ACTION

FIELD OF THE INVENTION

The invention generally relates to computer implemented systems and methods for utilizing detection of eye movements in connection with interactive graphical user interfaces. In particular, the present invention relates to systems and methods for assisting a user when interacting with a graphical user interface by combining eye based input with e.g. mechanical input, input from an IR-sensor, voice activated input, detection of body gestures or proximity based input for e.g. selection and activation of objects and object parts and execution of contextual actions related to the objects and object parts.

The present invention also relates to such systems and methods in which the user can configure and customize specific combinations of eye data input and other input (e.g. mechanical input, input from an IR-sensor, voice activated input, detection of body gestures or proximity based input) that should result in a specific contextual action.

BACKGROUND OF THE INVENTION

Human computer interaction has been revolutionized by the introduction of the graphical user interface (GUI). Thereby, an efficient means was provided for presenting information to a user with a bandwidth that immensely exceeded any prior channels. Over the years the speed at which information can be presented has increased further through colour screens, enlarged displays, intelligent graphical objects (e.g. pop-up windows), window tabs, menus, toolbars, etc. During this time, however, the input devices have remained essentially unchanged, i.e. the keyboard and the pointing device (e.g. the mouse, track ball or touch pad). In recent years, handwriting devices have been introduced (e.g. in the form of a stylus or graphical pen). Nevertheless, while output bandwidth has multiplied several times, the input bandwidth has been substantially unchanged. Consequently, a severe asymmetry in the communication bandwidth in the human computer interaction has developed.

In order to decrease this bandwidth asymmetry as well as to improve and facilitate the user interaction, various attempts have been made to use eye-tracking for such purposes. Monitoring or tracking eye movements and detecting a person's gaze point (as used herein, the point in space at which the person is looking) can be an important information source in analysing the behaviour or consciousness of the person. It can be used both for evaluating the object at which the person is looking and for evaluating the respective person. By implementing an eye tracking device in e.g. a laptop, the interaction possibilities between the user and the different software applications run on the computer can be significantly enhanced.

Hence, one interesting idea for improving and facilitating the user interaction and for removing the bandwidth asymmetry is to use eye gaze tracking instead or as a complement to mouse input. Normally, the cursor is positioned on the display according to the calculated point of gaze of the user. A number of different techniques have been developed to select and activate a target object in these systems. In one example, the system activates an object upon detection that the user fixates his or her gaze at a certain object for a certain period of time. Another approach is to detect an activation of an object when the user's eye blinks.

However, there are problems associated with these solutions using eye tracking. For example, the humans use their eye in perceptive actions instead of controlling. Therefore, it may be stressful to carefully use eye movements to interact with a computer, for example, to activate and select an object presented on the display of the computer. It may also be difficult to control blinking or staring in order to interact with objects presented on a display.

Thus, there is a need within the art for improved techniques that enable user interaction with a computer provided with an eye tracking device allowing the user to control, select and activate objects and parts of objects presented on a display of the computer using his or her eyes in a more intuitive and natural way. Furthermore, there is also a need within the art for techniques that in a more efficient way takes advantage the potential of using eye tracking for improving and facilitating the user interaction with a computer.

One such attempt is presented in US pat. Appl. No. 2005/0243054 to Keymer et al. in which a technology for selecting and activating a target object using a combination of eye gaze and key presses is disclosed. More specifically, a user looks at a target object, for example, a button on a graphical user interface and then presses a selection key of the keyboard. Once the selection key is pressed, a most probable target is determined using probability reasoning. The determined target object is then highlighted and the user can select it by pressing the selection key again. If the highlighted object is not the target object, the user can select another target object using additional keys to navigate to the intended target object.

However, this technology is limited to object selection and activation based on a combination of eye gaze and two sequential presses of one dedicated selection key.

Consequently, there still remains a need within the art of an improved technique that in a more efficient way takes advantage of the potential in using eye tracking for improving and facilitating the user interaction with a computer and in particular user interaction with graphical user interfaces.

An object of the present invention is to provide improved methods and systems for assisting a user when interacting with a graphical user interface by combining eye based input with other input, e.g. mechanical input, input from an IR sensor, voice activated input, detection of body gestures or proximity based input, for selection and activation of areas of a screen or display, objects and objects parts presented on the display and execution of contextual actions related to these areas, objects and object parts.

Another object of the present invention is to provide methods and systems for user friendly and intuitive interaction with graphical user interfaces.

In the context of the present invention, the term "GUI" (Graphical User Interface) refers to a graphics-based user interface with pictures or images and words (including e.g. signs and figures) on a display that incorporate, for example, movable windows and icons.

Further, in the context of the present invention the terms "object of interest" or "object part of interest" refer to an interactive graphical object or GUI object such as a button or a scroll bar hyperlink, or non-interactive objects such as a text or a word in a text that the user desires to select or activate through an eye gaze.

The term "contextual action" refers, in the context of the present invention, to an action than can be executed with respect to an object or object part based on eye data input and input from e.g. mechanical input devices such as a mouse or keys or buttons, input from an IR-sensor, voice activated input, or detection of body gestures or proximity based input. For example, the user gazes at a certain window displayed on the display and presses a certain key may result in the contextual action that the certain window is maximized. Another example is that when a user gazes at a web-link in a window and makes a certain gesture with her hand, the linked web page is opened.

According to an aspect of the present invention, there is provided a method for manipulating objects or parts of objects and performing contextual actions related to the objects presented on a display of a computer device associated with an eye tracking system. The method comprises displaying objects on the display of the computer device and providing an eye-tracking data signal describing a user's gaze point on the display and/or relatively said display. Activation input may be received from an input device (e.g. pressing a key of a keyboard or pressing a joystick button associated with the computer device. Further, activation input may be received from an IR-sensor, or may be voice activated input, or may be detection of body gestures or proximity based input. Thereafter, an object or a part of an object on which the user is gazing is determined by using the determined gaze point and/or the activation input. The object or object part is determined to be an object or object part of interest if current gaze conditions fulfil predetermined gaze conditions and/or the activation input fulfils predetermined conditions. A specific contextual action is determined based on the received activation input and the object or object part of interest. Finally, the specific contextual action is executed.

According to second aspect of the present invention, there is provided a system for assisting a user in manipulating objects or parts of objects and performing contextual actions related to the objects presented on a display of a computer device associated with an eye tracking system. The system comprises a display adapted to display objects. An input module is adapted to receive activation input from, for example, at least one key of a keyboard associated with the computer device, or a foot pedal, mechanical switch, joystick button, gamepad etc. Alternatively, the activation input may be received from e.g. an IR-sensor, or may be voice activated input, or may be detection of body gestures or proximity based input. Further, an object identifier is adapted to receive an eye-tracking data signal describing a user's gaze point on the display and/or relatively said display, to identify an object or a part of an object on which the user is gazing at using the determined gaze point and/or the activation input, and to determine the object to be an object of interest if current gaze conditions fulfil predetermined gaze conditions and/or the activation input fulfils predetermined conditions. An action determining module is adapted to determine a specific contextual action based on the received activation input and the object or object part of interest, and providing instructions for execution of the specific contextual action.

The present invention offers several advantages over known techniques. For example, the user can select and activate objects and execute contextual actions related to these objects in a user friendly, reliable and accurate way due to the intuitive way of function of the present invention. Commands and execution of contextual actions that traditionally requires a sequence of hand and/or finger manipulations can now efficiently and effortlessly be effected based on the user's eye activity and customized input. This is of great use and interest for ordinary computer users, for example, at work or at home. Furthermore, this is also desirable in a broad range of more specific applications such as, for example, support operators in a call-center environment (e.g. when entering/editing data in a customer relationship management application) and users of advanced computer aided design (CAD) tools. The invention may also be useful to improve the ergonomics and reduce the risk of e.g. repetitive strain injuries.

Moreover, because, according to a preferred embodiment, the user can define or configure which specific actions that should result from a specific combination of eye data input (e.g. selection of a certain object and detection of a dwell time of the gaze) and input (e.g. press of a specific key), a very user friendly and intuitive interaction environment based on that user's preferences and requirements can be created.

According to a further aspect of the present invention, eye gaze data and input in combination is used to enable a user to select, zoom and activate objects and object parts of interest. The user can magnify or enlarge an object or object part of interest or an area around a gaze point by gazing at the object or object part or at an area on a screen or display and delivering input, e.g. pressing a certain key of the keyboard. During a maintained mechanical input signal, e.g. maintained pressure on the key, the object or object part is gradually enlarged, and, thus, a zooming effect is achieved. By delivering a second mechanical input signal, e.g. by releasing the press of the key, the user may manipulate, click or activate the magnified object or object part. The user may adjust the gaze if necessary to adjust for e.g. inaccuracy of the eye tracker. The enlargement of the object or object part can be enlarged enough to cater for the average inaccuracy or offset error of the eye tracker.

In one example, the most probable object or object part can be zoomed or enlarged and centered on the determined gaze point. If it is the correct object or object part, the user may activate the object or object part by delivering the second input, e.g. by releasing the press on the key. To assist the user, a visual cue can be shown indicating which object or object part the user gaze rest upon. Alternatively, the determined gaze point can be shown to indicate for the user which object or object part that will be subjected to the contextual action will be performed after the enlargement (or zooming action), for example, where a click will be performed.

Further objects and advantages of the present invention will be discussed below by means of exemplifying embodiments.

BRIEF DESCRIPTION OF THE DRAWINGS

Exemplifying embodiments of the invention will be described below with reference to the accompanying drawings, in which.

DETAILED DESCRIPTION OF THE PREFERRED EMBODIMENT

The following is a description of exemplifying embodiments in accordance with the present invention. This description is not to be taken in limiting sense, but is made merely for the purposes of describing the general principles of the invention. It is to be understood that other embodiments may be utilized and structural and logical changes may be made without departing from the scope of the present invention.

Figure 1:
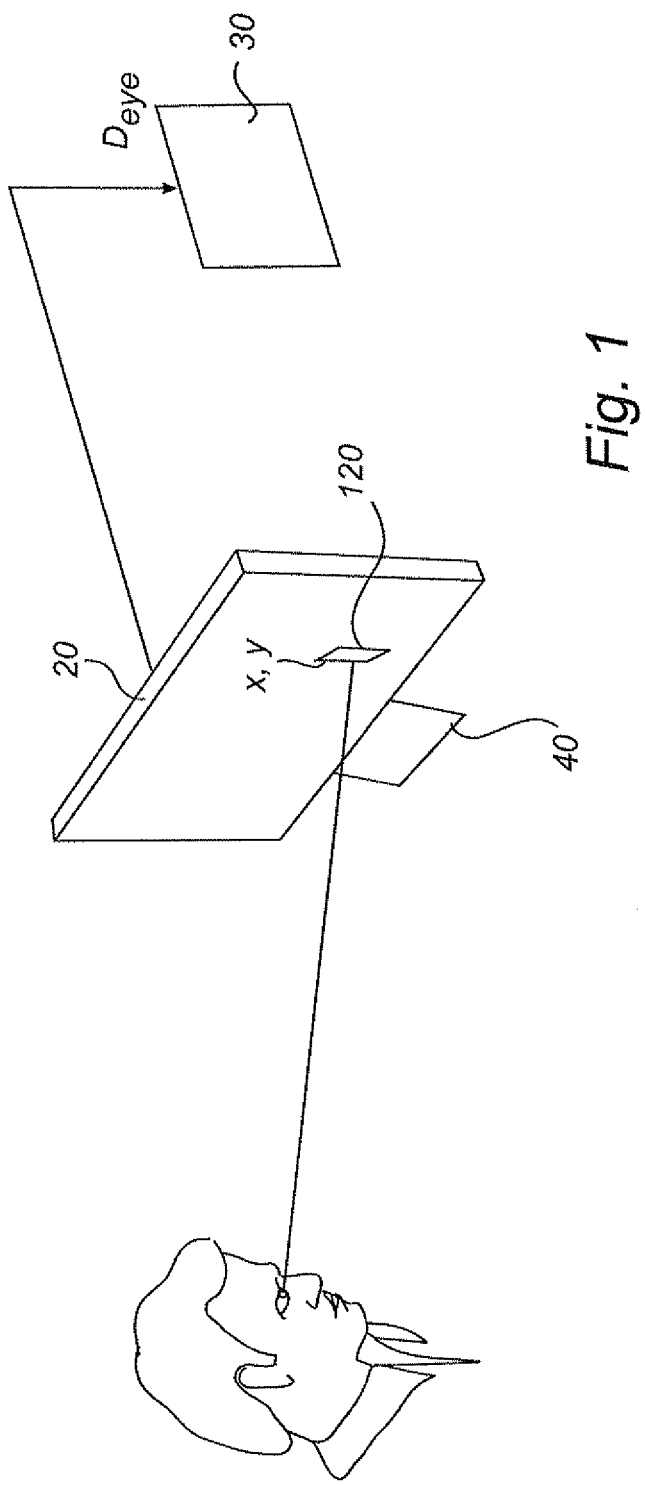
FIG. 1 shows an overview picture of a user controlling a computer apparatus in which the present invention is implemented.
Figure 2:
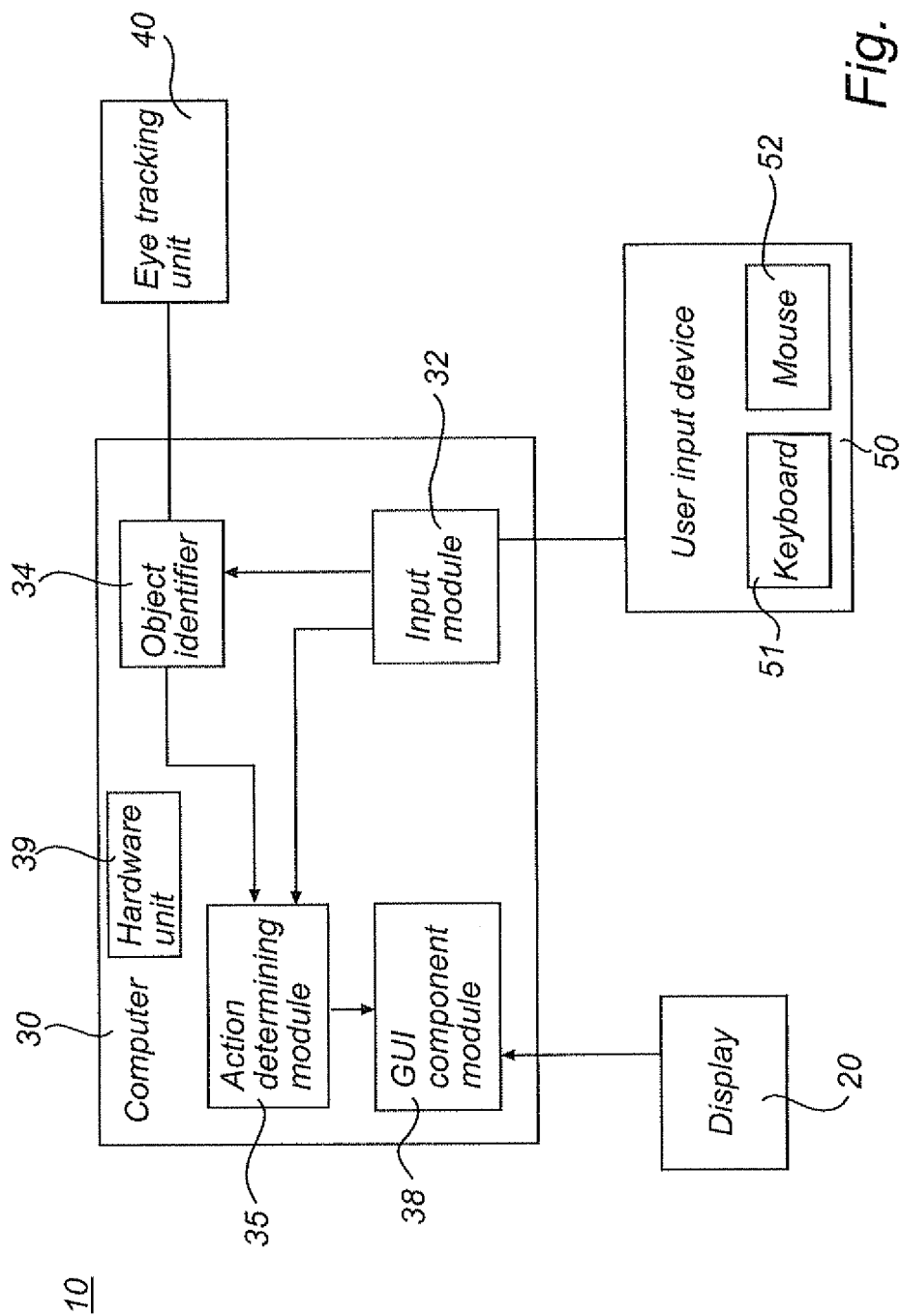
FIG. 2 is a block diagram illustrating an embodiment of an arrangement in accordance with the present invention.
Figure 4:
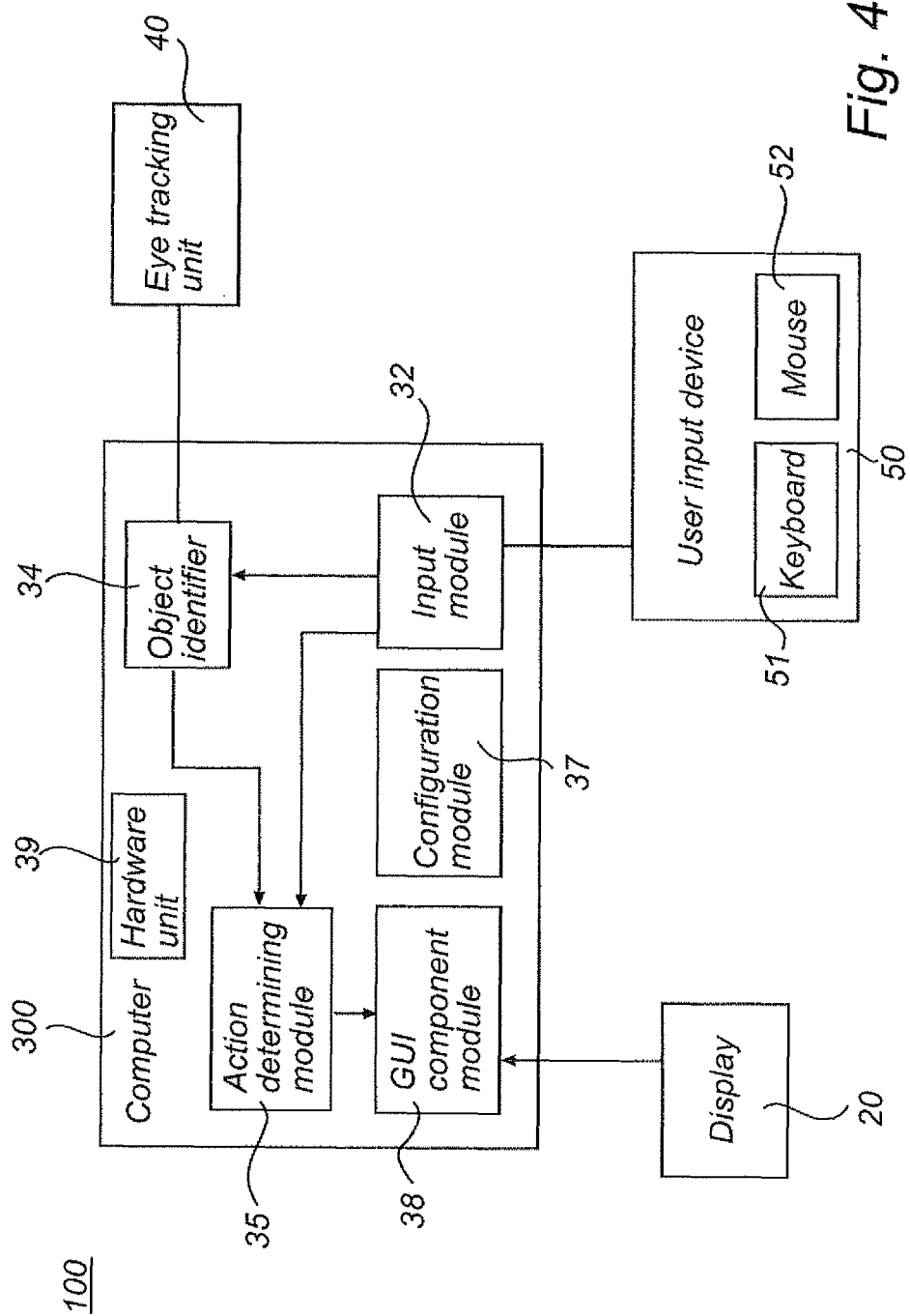
FIG. 4 a block diagram illustrating another embodiment of the arrangement in accordance with the present invention.

With reference first to FIGS. 1 and 2, and 4, embodiments of a computer system according to the present invention will be described. FIG. 1 shows an embodiment of a computer system with integrated gaze and manual control according to the present invention. The user 110 is able to control the computer system 10 at least partly based on an eye-tracking signal $D_{EYE}$, which described the user's point of regard x, y on a display 20. The display 20 may be any type of known computer screen or monitor, as well as combinations of two or more separate displays. For example, the display 20 may constitute a pair of stereoscopic screens, a heads-up display (HUD), or a head-mounted display (HMD).

Furthermore, the present invention may also be implemented in handheld devices with small keyboards and displays such as personal digital assistants, cell phones, portable music players (e.g. iPods), laptop computers, computer games, electronic books and similar other devices. The present invention may also be implemented in "intelligent environment" where, for example, objects presented on multiple displays can be selected and activated.

In order to produce the eye-tracking signal $D_{EYE}$, an eye-tracker unit 40 is included in the display 20 or computer 30, or is associated with the display 20 or with the computer 30. A suitable eye-tracker is described in the U.S. Pat. No. 7,572,008, titled "Method and Installation for detecting and following an eye and the gaze direction thereof", by the same applicant, which hereby is incorporated in its entirety.

The software programming associated with the eye tracking unit 40 may be included with the eye tracking unit 40 itself. The specific example shown in FIG. 2 illustrates the associated software implemented in an eye tracking module, which may be included solely in the computer 30, in the eye tracking unit 40, or in a combination of the two, depending on the particular application.

An object identifier 34 is adapted to determine an object or part of objects displayed on the display 20 at which the user 110 gazes based on the eye-tracking signal $D_{EYE}$ received from the eye-tracker unit 40.

By watching a representation of a GUI component 120 e.g. an interactive object such as a button, the user may generate commands to a computer 30. This manipulation is enabled since the GUI component is adapted to be, at least indirectly, influenced by the eye tracking signal $D_{EYE}$. According to the present invention, the user 110 is able to manipulate, for example, select and activate objects, parts of objects presented on the display 20 by means of a combination of the eye-tracking signal $D_{EYE}$ (generated by the gaze of the user) and user input or manual user action using the user input device 50, for example, by pressing a key or a key combination on the keyboard 51.

Thus, the computer system 10 comprises a computer 30, an eye-tracking unit 40, a display 20, and a user input device 50. The computer 30 may, for example, be any one from the group of a personal computer, computer workstation, mainframe computer, or a handheld device such as cell phone, portable music player (such as e.g. an iPod), or a laptop. Such a computer comprises several other components in addition to those illustrated in FIG. 2 but these components are omitted from FIG. 2 in illustrative purposes.

The user input device 50 comprises elements that are sensitive to pressure, physical contact or other manual control by the user, for example, a computer keyboard, a mouse, a "track ball", a touch-screen or any other device, for example, input from an IR-sensor, voice activated input, or detection of body gestures or proximity based input can be used. However, in the specific embodiment shown in FIG. 2, a keyboard 51 and a mouse 52 is included in the user input device 50.

An input module 32, which may be a software module included solely in the computer 30 or in the user input device 50, or in both, is adapted to receive signals from the user input device 50 representing manual user actions, for example, pressing a button of the keyboard 51. The input module 32 is also adapted to interpret the received signals. For example, electrical signals are received from the keyboard 51 and the input module 32 provides an output as a specific letter on the display 20. As in another specific example, the input module 32 provides an output for use in the determination of a specific contextual action to be executed. The output represents the received electrical signal caused by the manual activation input (e.g. the press of a predetermined key, a combination of keys, or multiple presses of a key). As will be explained in more detail below, the specific contextual action to be executed is determined in an action determining module 35 based on the determination of that the user gazes on an object or part of an object and the manual activation input via the user input device 50. Such a contextual action could, for example, be, as will be discussed further below, to bring a window to the front and into focus. Thus, the user is able to select an unfocused window for focus by gazing at it in combination with a press of a certain key or a combination of keys.

The action determining module 35 is adapted to determine the contextual actions based on the object of interest or the part of the object of interest in combination with the manual activation input. For example, the action determining module 34 may include a library comprising list of contextual actions to be executed for each combination of object or part of object and manual activation input.

In one exemplary embodiment of the present invention shown in FIG. 4, the user 110 may manually configure the combination of manual activation input and object or part of object. Like parts, modules and components shown in FIGS. 2 and 4 are denoted with the same reference numerals and description thereof are omitted below. By allowing the user to manually customize or configure the combinations, it is possible to determine which specific combination of manual activation input and of object of interest or part of object of interest that should result in a contextual action. The manual activation input may consist of any kind of input or any combination of input, for example, in case of two eye tracker function buttons, each button may be associated with separate actions (in combination with the gaze on an object or part of object), but pressing of two buttons simultaneously may be associated with a third action. The actions may also be triggered by multiple clicks of the eye-tracker function button. For example, double-click or single click, where double clicking could trigger a different action than single clicking in combination with that the user gazes at the same object or part of object. As mentioned above, the eye tracker function button or buttons could be configurable. Hence, even if they depend upon the same object or part of object the user gazes at it is possible to associate different actions with the object or part of object. For example, by gazing at a window title bar, the user could configure the eye tracker function button to maximize the window. But the same eye tracker function button could also be configured to drag the window with the gaze. For this purpose, the system 100 includes a configuration module 37, which may be a software module included in the computer 300, is configured to receive input signals from the user input device 50 containing instructions regarding the user configuration of the eye tracker function buttons and to deliver output to the action determining module 35 containing the user defined configuration of the eye tracker function buttons.

The action determining module 35 may also be adapted to use the current state of the object in the determination of the contextual action to be executed, for example, if the object is disabled the contextual action can be inhibited. In addition, the action determining module 35 may use historical state of the operating system of the computer 30 and/or the historical state of the computer 30 and/or the current state of the operating system and/or the current state of the computer 30 and/or the current state of the user when determining the contextual action to be executed.

A GUI component module 38 is adapted to be manipulated based on user generated commands and/or instructions from the action determining module 35. The GUI component module 38 may include a video unit that generates signals representing images for presentation on the display 20.

Further, a hardware unit 39 comprising, for example, a loud speaker, and a web camera is included in or associated to the computer 30. The hardware unit may be manipulated based on user generated commands and/or instructions from the action determining module 35. In addition, other devices and components (not shown) such as a printer may be connected to the computer 30 and may be manipulated based on user generated commands and/or instructions from the action determining module 35.

A non-exhaustive list of possible contextual actions executed based on a combination of input and eye data will now be given below.

By gazing at a background window while pressing the eye tracker function button, the user may bring the window to the front. In this case, the manual activation input is the press of the eye tracker button. The object of interest is the window the user wishes to bring to front. At receipt of the manual input and the gaze data defining the object or object part of interest, the action determining module 35, output instructions for the GUI component module 38 to display, select, or activate the object in accordance with the determined contextual action, i.e. bringing the window to the front at the display 20.

By gazing at a window in the foreground with focus, the user may drag the window with head movement, by holding the eye tracker function button down. In this case, the manual activation input is the press and the maintained press of the eye tracker button. The object of interest is the window in the foreground with focus. At receipt of the manual input and the gaze data defining the object or object part of interest, the action determining module 35, output instructions for the GUI component module 38 to display, select, or activate the object in accordance with the determined contextual action, i.e. dragging the window over the display 20.

By gazing at a window title-bar and pressing the eye tracker function button, the user may maximize the window. In this case, the manual activation input is the press of the eye tracker button and the part object of interest is the window title-bar. At receipt of the manual input and the gaze data defining the object or object part of interest, the action determining module 35, output instructions for the GUI component module 38 to display, select, or activate the object in accordance with the determined contextual action, i.e. maximizing the window presented on the display 20.

In one embodiment of the present invention, an eye tracker function button can be configured to act as a left mouse click. By gazing at a GUI component on the display 20, a press of the eye tracker function button may result in a click of the GUI component at the gaze point. The manual activation input is in this case the key press and the object of interest is the GUI component. At receipt of the manual input and the gaze data defining the GUI component of interest, the action determining module 35 may output instructions to execute a mouse click on the GUI component.

In one embodiment of the present invention, an eye tracker function button can be configured to act as a GUI component selector. By gazing at a GUI components on the display 20, a press of the eye tracker function button may highlight or select the GUI component at the gaze point. The manual activation input in this case is the key press and the object of interest is the GUI component. At receipt of the manual input and the gaze data defining the GUI component of interest, the action determining module 35 may output instructions to highlight/select the GUI component.

During display of a movie, the user may pause or resume the movie with the eye tracker function button. In this case, the manual activation input is the press of the eye tracker button and the object of interest is the movie. At receipt of the manual input and the gaze data defining the object or object part of interest, the action determining module 35, output instructions for the GUI component module 38 to display, select, or activate the object in accordance with the determined contextual action, i.e. pausing or resuming the display of the movie on display 20.

By gazing at the upper part of a vertical volume control and pressing the eye tracker button, the user could increase the volume, and by gazing at the lower part of the volume control and pressing the button the volume could be lowered instead. The manual activation input is the key press and the object part of interest is the upper part or the lower part of the volume control. At receipt of the manual input and the gaze data defining the object or object part of interest, the action determining module 35, output instructions for the hardware unit 39 to display, select, or activate the object in accordance with the determined contextual action, i.e. increasing or lowering the volume.

By gazing at a large image, the user could smoothly pan the image by centering the part of the image that is at the gaze-point by pressing an eye tracker function button. The manual activation input is the key press and the object of interest is the image. At receipt of the manual input and the gaze data defining the object or object part of interest, the action determining module 35, output instructions for the GUI component module 38 to display, select, or activate the object in accordance with the determined contextual action, i.e. smoothly panning the image over the display 20.

By gazing at a large image, the user could smoothly pan the image by gazing at the image and pan it with a body gesture such as hand movements. The manual activation input is the hand movements. At receipt of the manual input and the gaze data defining the object or object part of interest, the action determining module 35, output instructions for the GUI component module 38 to display, select, or activate the object in accordance with the determined contextual action, i.e. smoothly panning the image over the display 20.

By gazing at an image, the user may zoom into the image at the gaze point by pressing of one eye tracker function button and zoom out by pressing another eye tracker function button. The manual activation input is the key presses and the object of interest is the image. At receipt of the manual input and the gaze data defining the object or object part of interest, the action determining module 35, output instructions for the GUI component module 38 to display, select, or activate the object in accordance with the determined contextual action, i.e. zoom in or zoom out on the display 20. Alternatively the position of the eyes' distance to display 20 (in effect the distance of the head to display 20) could be used to determine whether one eye tracker function button should zoom or not. If the distance to display 20 is below a given threshold it could zoom in, with a particular speed. If it is above a given threshold it could zoom out, with a particular speed.

By gazing at a web-link and pressing an eye tracker function button, the user may be given a preview of the webpage without leaving the current page. The preview could be shown in a popup window. The manual activation input is the key press and the object of interest is the web-link. At receipt of the manual input and the gaze data defining the object or object part of interest, the action determining module 35, output instructions for the GUI component module 38 to display, select, or activate the object in accordance with the determined contextual action, i.e. display a preview of the webpage in a pop-up window on the display 20.

By gazing at a web-link and pressing an eye tracker function button, the user may navigate to the page of the web-link. The manual activation input is the key press and the object of interest is the web-link. At receipt of the manual input and the gaze data defining the object or object part of interest, the action determining module 35, output instructions for the GUI component module 38 to display, select, or activate the object in accordance with the determined contextual action, i.e. navigate to the page to which the web-link links and show the page on the display 20.

By gazing at a foreign word in a text and pressing the eye tracker function button a translation of the word can be shown in a popup window. The manual activation input is the key press and the object part of interest is the foreign word. At receipt of the manual input and the gaze data defining the object or object part of interest, the action determining module 35, output instructions for the GUI component module 38 to display, select, or activate the object in accordance with the determined contextual action, i.e. the translation of the word is shown in a popup window on the display 20.

By gazing at an application icon on the desktop displayed on the display 20, the user may start that application by also pressing the eye tracker function button. The manual activation input is the key press and the object of interest is the icon. At receipt of the manual input and the gaze data defining the object or object part of interest, the action determining module 35, output instructions for the GUI component module 38 to display, select, or activate the object in accordance with the determined contextual action, i.e. starting the application and show the application window on display 20.

By gazing at a contact list and pressing the eye tracker function button, the user may scroll the contact list, by e.g. one whole contact (as opposed scrolling line by line that a normal or traditional mouse wheel does). This is also different to automatic scrolling methods, where unintentional scrolling may occur. The activation input is the key press and the object of interest is the contact list. At receipt of the manual input and the gaze data defining the object or object part of interest, the action determining module 35, output instructions for the GUI component module 38 to display, select, or activate the object in accordance with the determined contextual action, i.e. scroll the contact list on display 20.

If no object is determined or no object of interest can be found, a press of the eye tracker function button may move the mouse cursor to the gazepoint at the display 20. The manual activation input is the key press and the object of interest is in this case no object. At receipt of the manual input and the gaze data defining that no object is of interest, the action determining module 35, output instructions for the GUI component module 38 to display the mouse cursor at the gazepoint on the display.

By gazing at a number input field and pressing a first eye tracker function button may increase the number in the field while pressing a second button may decrease the number in the field. The manual activation input is the key presses and the object part of interest is the number input field. At receipt of the manual input and the gaze data defining the object part of interest, the action determining module 35 output instructions for the GUI component module 38 to increase or decrease the number in the field depending on the specific key press.

By gazing at a reminder window or alarm and pressing the eye tracker button the user may snooze or mute the alarms. The manual activation input is the key press and the object part of interest is the reminder window or alarm. At receipt of the manual input and the gaze data defining the object part of interest, the action determining module 35 output instructions for the GUI component module 38 to mute or snooze the alarm depending on the gaze data.

By gazing away from the computer display and pressing the eye tracker function button the user may turn off the display. The manual activation input is the key press and in this case no object is of interest. At receipt of the manual input and the gaze data defining that no object is of interest, the action determining module 35 output instructions to display 20 to turn off, or enter a power save mode.

In a 3D application, the user may rotate an object at which the user gazes at by pressing an eye tracker function button. The user may rotate the object in an opposite direction by pressing another eye tracker function button. The manual activation input is the key press and the object part of interest is the object the user gazes at. At receipt of the manual input and the gaze data defining the object part of interest, the action determining module 35 output instructions for the GUI component module 38 to rotate the object of interest.

As indicated above, this is only a non-exhaustive list of conceivable contextual actions the may be executed by a combination of eye gaze and other input and, of course, there a large number of other contextual actions that can be executed by means of the present invention.

Figure 3:
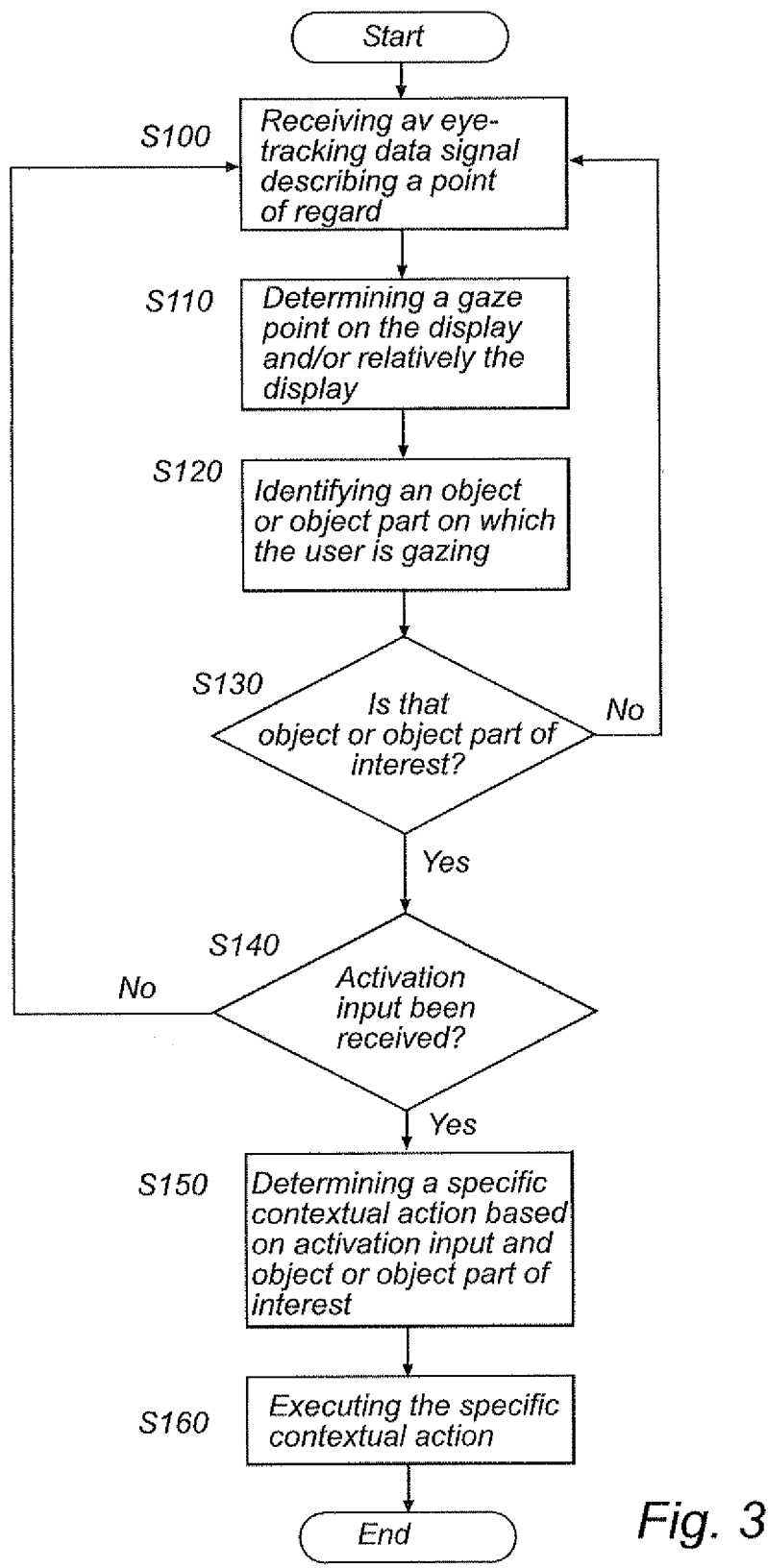
FIG. 3 is a flow chart illustrating the general principles of a method according to the present invention.

With reference now to FIG. 3, an embodiment of the method according to present invention will be discussed. The method for manipulating objects or parts of objects and performing contextual actions related to the objects is preferably performed using a computer system, for example, in accordance with the system described with reference to FIGS. 1, 2 and 4. A number of objects are presented on the display 20 and, at step S100, an eye-tracking data signal $D_{EYE}$ describing a user's point of regard x, y on the display 20 is provided by the eye tracking unit 40 and may be delivered to the computer 30. In FIG. 1, the user's point of regard is a point of the object 120. Input may also be received from the user input device 50, for example at least one key of a keyboard 51 may be pressed or a combination of keys may be pressed.

Thereafter, at step S110, a gaze point of the user on the display 20 using the eye-tracking data is determined. This can be performed in the eye tracking unit 40 or in the object identifier 34. At step S120, an object or a part of an object on which the user is gazing is identified using the determined gaze point and/or the input from e.g. the keyboard, and, with reference to FIG. 1 the user gaze is determined to fall on object 120. That is, it is determined whether the eye tracking data signal $D_{EYE}$ indicates that the user's point of regard falls within a GUI components representation on the display 20. In embodiments, the input from e.g. the keyboard is also used to determine the object or object part of interest, for example, a specific eye function button may be associated with windows (i.e. the combination of a gaze on a window and the press of the key associated with windows identifies that window as the object of interest). Another key may be associated with images and the combination of a gaze on an image, which resides in a window, and the press of the key associated with windows identifies that window as the object of interest even though the user is gazing upon the image.

Thereafter, at step S130, it is checked whether the object or object part is an object or object part of interest. This is made by checking if current gaze conditions fulfil predetermined gaze conditions and/or if the input from e.g. the keyboard fulfils predetermined conditions. For example, it may be checked whether the user's gaze has fallen on the object or object part for a predetermined period, or, in other words, whether the so called dwell time exceeds a predetermined limit. The dwell time is defined as the difference between the gaze-enter point of time, which is the time instance when the eye tracking data signal $D_{EYE}$ indicates that the user's point of regard falls within a GUI components representation on the display 20, and the gaze-leave point of time, which is the time instance when the eye tracking data signal $D_{EYE}$ indicates that the user's point of regard falls outside this representation. Thus, if the gaze falls upon an object or object part during a sufficiently long period of time it is judged that the user is interested in that particular object or object part. As mentioned above, input from e.g. the keyboard may also be used in the determination whether an object or object part is an object or object part of interest.

If it is judged that the user is interested in that particular object or object part, it is checked, at step S140, whether activation input from the user input device 50 has been received, for example whether at least one key of the keyboard has been pressed or a combination of keys have been pressed. This may be checked at the input module 32 or the action determining module 35. It may also be checked whether this manual input has been received in connection to the user selection of an object or object part (i.e. that it has been determined that the user gazes at an object or object part) or sufficiently close in time with the user selection. Thereby, it can be verified that a received manual user input actually is intended for the user selection or activation of contextual action related to a specific object or object part.

Then, at step S150, a specific contextual action to be executed is determined based on the received activation input and the object or object part of interest in the action determining module 35. Above, a non-exhaustive number of possible contextual actions resulting from different combinations of input from e.g. the keyboard and eye data input. Further, the decision which contextual action to execute may also be based on a state of the object of interest, and/or a historical and/or a current state of the operating system, and/or determining a historical and/or a current state of the computer 30. This, in effect, also includes the state of the current user since e.g. an eye tracker or an EMG detection device can be used to input the user's state to a computer. For example, eye gaze movements or eye blinks might be used to detect if a user is feeling tired, is falling into sleep or is distracted. The user may configure a manual activation input including selecting which input or combination of input in combination with which eye-tracking data input that should result in a specific contextual action upon selection of a specific object of interest or part of object of interest. For example, the user may select that the combination of gazing at a window in the background at an unfocused window and pressing the eye tracker function button (which the user may select to be e.g. the "R" key or which may be a dedicated "eye function" button or key of the keyboard) shall result in that the window is brought to front. Moreover, the user may configure the predetermined gaze conditions including selecting which gaze conditions to be fulfilled to result in a specific contextual action. For example, the user may determine that a certain dwell time is required in order to determine that the gaze of the user falls on an object and that object is an object of interest. At step S160, the action determining module 35 sends instructions to the GUI component module 38 to execute the determined contextual action.

Figure 5:
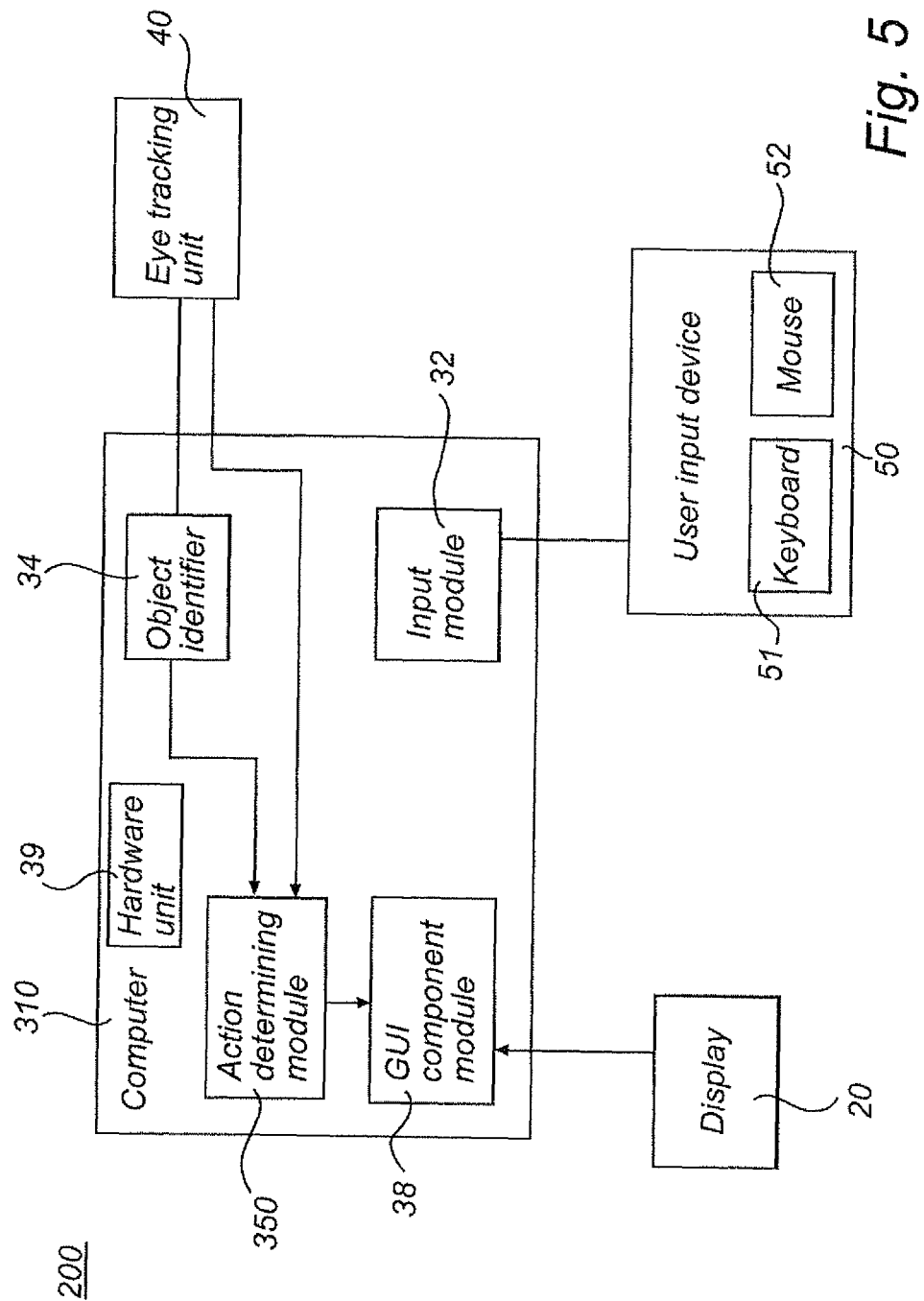
FIG. 5 is block diagram illustrating a further embodiment of an arrangement in accordance with the present invention.
Figure 6:
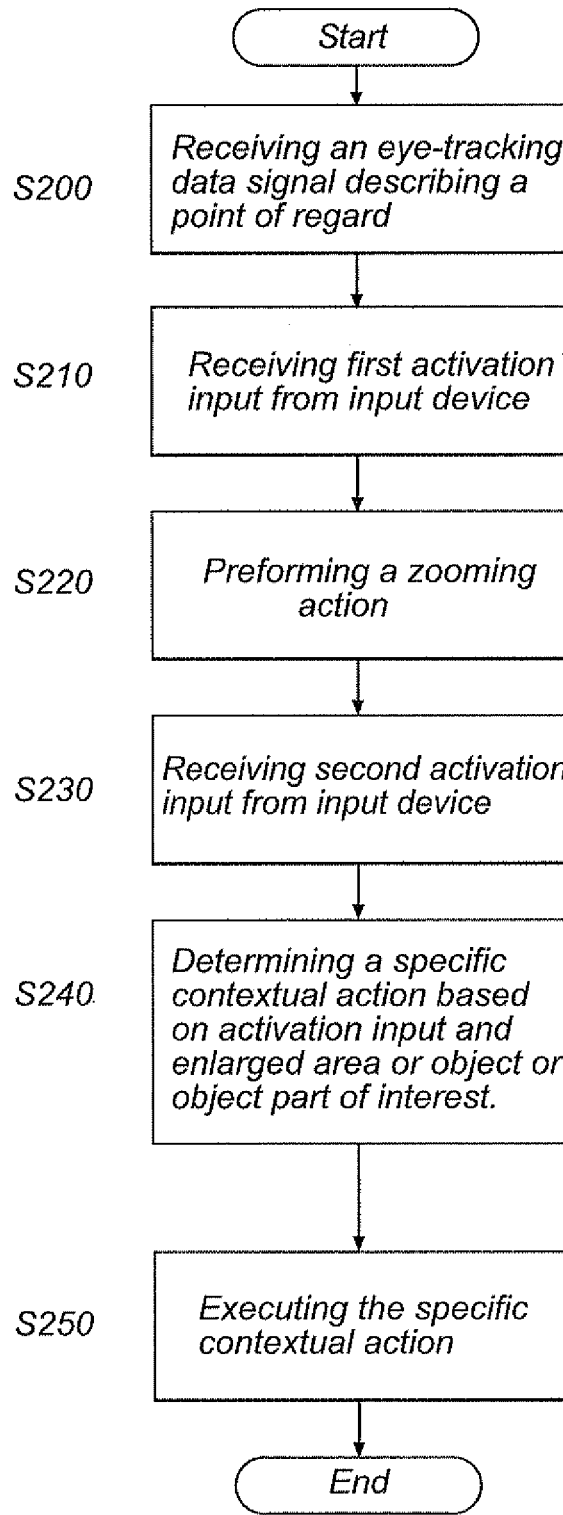
FIG. 6 is a flow chart illustrating the general principles of a method according to the present invention.

With reference to FIGS. 5 and 6, further aspects and embodiments of the present invention will be discussed. In principle, eye gaze data and input from e.g. the keyboard in combination is used to enable a user to select, zoom and activate objects and object parts of interest.

The user can magnify or enlarge an object or object part of interest or an area around a gaze point by gazing at the object or object part or at an area presented on the display 20 and delivering user input, e.g. pressing a certain key of the keyboard. During a maintained user input signal, e.g. maintained press of the key, the object or object part is gradually enlarged, and, thus, a zooming effect is achieved. By delivering a second input signal, e.g. by releasing the press of the key, the user may manipulate, click or activate the magnified object or object part. The user may adjust the gaze if necessary to adjust for e.g. inaccuracy of the eye tracker. The enlargement of the object or object part can be enlarged enough to cater for the average inaccuracy or offset error of the eye tracker.

In one example, the most probable object or object part can be zoomed or enlarged and centered on the determined gaze point. If it is the correct object or object part, the user may activate the object or object part by delivering the second input, e.g. by releasing the press on the key. To assist the user, a visual cue can be shown indicating which object or object part the user gaze rests upon. Alternatively, the determined gaze point can be shown to indicate for the user which object or object part that will be subjected to the contextual action that will be performed after the enlargement (or zooming action), for example, where a click will be performed.

With reference to FIG. 5, an embodiment of a computer system according to the present invention will be described. Like or similar parts, modules and components of the system shown in FIGS. 2, 4, and 5 will be denoted with the same reference numerals and the description thereof will be omitted in the following.

The system 200 according to this embodiment, includes a computer 310 comprising an action determining module 350 adapted to receive a first activation input from the input device 50 via the input module 32. The first input may be a maintained press of a certain key of the keyboard 51. The action determining module 350 is adapted to determine whether a zooming action should be performed and, in such a case, which area, object, or object part that should be enlarged based on the received input and the gaze point. In one embodiment, an area centered on the gaze point is enlarged. In another embodiment, an object or object part of interest is enlarged, wherein an object or object part of interest is selected as the object or object part upon which the gaze of the user rests. Accordingly, the action determining module 350 may receive the gaze point from the eye tracking unit 40 or may receive an object or object part of interest from the object identifier 34. The action determining module 350 sends instructions to the GUI component module 38 which area, object, or object part displayed on the display 20 that should be enlarged. The enlargement can be performed in sequential steps or in a continuous manner at a predetermined enlargement rate. The action determining module 350 is further adapted to, upon receiving second activation input from the input device 50, via the input module 50, determine a specific contextual action based on the received second activation input and said enlarged area or object or object part of interest. In one embodiment, the second input is release of the pressed key and the contextual action is, for example, click of the object or object part of interest. The action determining module 350 is adapted to send an instruction to the GUI component module 38 to execute the specific contextual action.

Referring now to FIG. 6, an embodiment of the method according to present invention will be discussed. The method for manipulating objects or parts of objects and performing contextual actions related to the objects is preferably performed using a computer system, for example, in accordance with the system described with reference to FIGS. 1 and 5. A number of objects are presented on the display 20 and, at step S200, an eye-tracking data signal $D_{EYE}$ describing a user's point of regard x, y on the display 20 is provided by the eye tracking unit 40 and may be delivered to the computer 30. In FIG. 1, the user's point of regard is a point of the object 120.

At step S210, input is received from the user input device 50. In a preferred embodiment, one key of the keyboard 51 is pressed and the press is maintained. Thereafter, at step S220, a zooming action is performed, wherein an area around the gaze point or an object or object part of interest is gradually enlarged. The user 110 may adjust for the eye-tracker unit's inaccuracy by moving around his/her gaze or head. Since the area around the gaze point or the object or object part of interest is gradually enlarged, the adjustment of a gaze point will be easy. In an alternative embodiment, the most probable object or object part of interest may be enlarged and centered on the gaze point. Which object or object part to enlarge can be determined by probability calculation, for example, the object or object part being geometrically closest to the gaze point may be selected. The object or object part may also be selected on basis of stored user patterns, for example, the previously most used object or object part within an area surrounding the gaze point may be selected. In addition, the selection may be based on a state of the object or object part of interest, and/or a historical and/or a current state of the operating system, and/or a historical and/or a current state of the computer. If the enlarged object or object part is the correct object or object part (i.e. the object or object part the user actually desires to activate), the user may release the pressure of the key to activate the object (step S230 and S240, see below). However, if it is not the correct object or object part, the user may adjust his/her gaze. A visual cue may be shown to assist the user indicating the object being selected for enlargement after an adjustment. Alternatively, the gaze point may be indicated or shown to show the user where the gaze point is.

When the correct object, object part or area has been enlarged, the user can activate or click on the object, object part or area, at step S230, by delivering second activation input using the input device 50. Preferably, the activation input is release of the pressure of the key of the keyboard 51. At step S240, a specific contextual action is determined in the action determining module 350 based on the received activation input and the enlarged area or object or object part of interest. In one embodiment, the contextual action is activation or click of the object or object part, for example, click on a web-link. At step S250, instructions is sent to the GUI component module 38 to execute the contextual action, e.g. to navigate to the page to which the web-link links and show the page on the display 20.

While the invention disclosed herein has been described by means of specific embodiments and applications thereof, numerous modifications and variations could be made therein by those skilled in the art without departing from the scope of the inventions, which is defined by the appended claims.

That which is claimed is:

1. A method for manipulating objects or part of one of the objects and performing contextual actions related to the objects presented on a display of a computer device associated with an eye tracking unit, the computer device configured to store a plurality of predefined contextual actions to be executed for each combination of an eye tracking data signal and one of a plurality of predefined activation inputs, the method comprising:

displaying objects on the display of the computer device;

generating, from the eye tracking unit, an eye-tracking data signal identifying a user's gaze point to one of the displayed objects or part of one of the displayed objects on the display;

receiving, from a mechanical input device and based on a user's selection, one of the plurality of predefined activation inputs;

determining a specific contextual action based on the eye tracking data signal identifying the one of the displayed objects or the part of one of the displayed objects in combination with the user's selected predefined activation input, with the predefined activation input being configured as an input signal indicating a continuously maintained activation of the mechanical input device, and determining the specific contextual action is performed in response to releasing the continuously maintained input of the mechanical input device, and wherein different predefined activation inputs for a same object or object part of interest result in determining different specific contextual actions; and executing the specific contextual action.

2. The method of claim 1, wherein the specific contextual action is determined by a list identifying contextual actions to be executed for each combination of object or object part and activation input.

3. The method of claim 1, further comprising:
configuring which specific contextual action should result from a specific combination of object or object part of interest on which the user is gazing and received activation input.

4. The method of claim 1, wherein determining a specific contextual action is further based on a historical or current state of the object or object part of interest.

5. The method of claim 1, further comprising:
showing the user's gaze point on the display to indicate for the user which object or object part that will be subjected to the contextual action.

6. The method of claim 1, wherein said contextual action is determined by a probability calculation.

7. The method of claim 6, wherein said probability calculation selects the object or object part geometrically closest to the user's gaze point.

8. The method of claim 6, wherein said probability calculation is based on stored user patterns.

9. The method of claim 6, wherein said probability calculation is based on a state of an object or of an object part of interest.

10. The method of claim 6, wherein said probability calculation is based on a historical or current state of the computer device.

11. The method of claim 1, wherein the mechanical input device is a keyboard.

12. The method of claim 1, wherein the mechanical input device is a mouse button.

13. The method of claim 1, wherein the mechanical input device is a touch pad.

14. A system for assisting a user in manipulating objects or part of one of the objects and performing contextual actions related to the objects presented on a display of a computer device associated with an eye tracking unit capable of determining user's gaze, the system comprising:
a display;
a computer device configured to generate objects on said display;
an eye tracking unit configured to generate an eye tracking data signal identifying a user's gaze point to one of the generated objects or part of one of the generated objects on said display; and
a mechanical input device configured to generate, based on a user's selection, one of a plurality of predefined activation inputs;
said computer device configured to:
store a plurality of predefined contextual actions to be executed for each combination of the eye tracking data signal and one of the plurality of predefined activation inputs,
determine a specific contextual action based on the eye tracking data signal identifying the one of the displayed objects or the part of one of the displayed objects the part of the displayed objects in combination with the user's selected predefined activation input, with the predefined activation input being configured as an input signal indicating a continuously maintained activation of the mechanical input device, and determining the specific contextual action is performed in response to releasing the continuously maintained input of the mechanical input device, and wherein different predefined activation inputs for a same object or object part of interest result in determining different specific contextual actions, and
execute the specific contextual action.

* * * * *